(12) United States Patent
Luo (10) Patent No.: US 6,847,505 B2
(45) Date of Patent: Jan. 25, 2005

(54) ELECTROSTATIC DISCHARGE PROTECTION FOR DISK DRIVE INTEGRATED LEAD SUSPENSION

(75) Inventor: Jih-Shiuan Luo, San Jose, CA (US)

(73) Assignee: Hitachi Global Storage Technologies, The Netherlands B.V., Amsterdam (NL)

( * ) Notice: Subject to any disclaimer, the term of this patent is extended or adjusted under 35 U.S.C. 154(b) by 117 days.

(21) Appl. No.: 10/099,337

(22) Filed: Mar. 14, 2002

(65) Prior Publication Data

US 2003/0174445 A1 Sep. 18, 2003

(51) Int. Cl.$^7$ ................................................. G11B 5/40
(52) U.S. Cl. ................................................. 360/245.8
(58) Field of Search ........................... 360/245.8, 323, 360/137, 245.3; 361/212; 200/161 D; 204/217

(56) References Cited

U.S. PATENT DOCUMENTS

| | | | |
|---|---|---|---|
| 5,491,605 A | 2/1996 | Hughbanks et al. | 360/323 |
| 5,680,274 A | 10/1997 | Palmer | 360/245.9 |
| 5,710,682 A | 1/1998 | Arya et al. | 360/245.8 |
| 5,748,412 A | 5/1998 | Murdock et al. | 360/323 |
| 5,812,357 A * | 9/1998 | Johansen et al. | 361/212 |
| 5,959,827 A | 9/1999 | Smith et al. | 361/212 |
| 5,963,415 A * | 10/1999 | Johansen | 361/212 |
| 6,034,851 A * | 3/2000 | Zarouri et al. | 360/137 |
| 6,054,330 A | 4/2000 | Phipps et al. | 438/3 |
| 6,067,220 A | 5/2000 | Ahmann et al. | 361/111 |
| 6,163,443 A * | 12/2000 | Hatagami et al. | 360/323 |
| 6,219,202 B1 * | 4/2001 | Palmer | 360/234.5 |
| 6,507,467 B1 * | 1/2003 | Schadewald et al. | 360/323 |
| 6,515,832 B1 * | 2/2003 | Girard | 360/245.3 |
| 6,518,521 B1 * | 2/2003 | Marek et al. | 200/16 D |
| 6,531,037 B2 * | 3/2003 | Ohmori | 204/217 |
| 2003/0035252 A1 * | 2/2003 | Motonishi et al. | 360/323 |

* cited by examiner

Primary Examiner—Tianjie Chen
(74) Attorney, Agent, or Firm—Liu & Liu (57) ABSTRACT

The present invention couples shunting pads to the conductor leads of a suspension assembly for supporting a slider in a magnetic storage system, which can be use to temporarily shunt the leads to prevent against damage to the heads by electrostatic discharge. In one embodiment, the suspension assembly includes shunting pads that are sized and positioned to allow shunting using a probe. In another embodiment, a suspension assembly includes a built-in shunting tab that when applied, temporarily shunts the MR read head and prevents any transient voltage from developing across the head. In a further embodiment a tool having multiple probes is integrated into a jig, which is used for holding and shunting one or more suspension assemblies during processing. In one embodiment, the present invention is applied to an integrated lead suspension assembly.

30 Claims, 6 Drawing Sheets

ELECTROSTATIC DISCHARGE PROTECTION FOR DISK DRIVE INTEGRATED LEAD SUSPENSION

BACKGROUND OF THE INVENTION

1. Field of the Invention

This invention relates in general to protection against damage to magnetic head assemblies caused by electrostatic discharge (ESD) during handling and assembly thereof on a suspension assembly for a magnetic storage device, and more particularly to a method of protecting a magnetoresistive (MR) head attached to a suspension assembly against damage caused by ESD.

2. Description of Related Art

MR sensors are well known and are particularly useful as read elements in thin film heads ("MR heads") for sensing recorded signals on magnetic disks in magnetic disk drive systems used in the computer industry. A typical MR head includes a thin strip of magnetoresisitive material that is positioned between a pair of thin film gap layers, which are in turn sandwiched between a pair of thin film shield layers. The MR head along with a write transducer, which is used for recording information to the magnetic disk, are manufactured using thin film and photolithography process, as part of a slider. The slider is attached to the tip of a flexible member that is cantilevered from an actuator arm for positioning the head relative to the magnetic disk surface to perform read and write operations. This head and suspension assemblage is often referred to in the industry as a head-gimbal assembly or HGA.

As the storage density of disk drives increase, the size of the MR heads are reduced, making it increasingly vulnerable to damage caused by ESD. A major problem that is encountered during manufacture, handling and use of MR heads is the buildup of electrostatic charge on various objects, such as assembly tools and fixtures which come into electrical contact with the heads. The discharge of electrostatic voltages of only a few volts through the MR heads is sufficient to produce electrical current capable of severely damaging or completely destroying the MR heads. Manufacturing yields can therefore be negatively affected because ESD damage may be introduced at any stage during the assembly of the disk drive, and the damaged MR head can only be practically tested and discovered towards the end of the manufacturing process. For those MR heads which were degraded as a result of damage during processing but which passed initial acceptance tests by the manufacturer, the performance, reliability, and service life of the assembled magnetic disk drive having the damaged heads are put into question.

There have been a number of ESD protection schemes adopted in the past. U.S. Pat. No. 5,710,682 assigned to International Business Machines Corporation disclosed an ESD protection scheme for an integrated suspension assembly of the type that uses twisted leads for the read head, which deploys a shorting bar that automatically shorts the read head prior to final assembly. A shorting bar attached to the actuator arm automatically shunts the lead wires of the read head upon absence of support for the record head. This provides an electrostatic discharge path around the read head, rather than through it.

In an integrated lead suspension (ILS) assembly, integrated conductor leads or traces are formed in a layer on the surface of the flexure, instead of twisted wire as described above in U.S. Pat. No. 5,710,682. ILS assemblies are significantly smaller in dimensions compared to integrated suspension assemblies, with leads/traces that are formed in close tolerance and clearance. The leads terminate on contact pads at the end face of the slider; one pair of leads is in electrical connection with the MR head and the other pair of leads is in electrical connection with a write transducer. The other ends of the leads terminate in a multiconnector that extends from the load bearing support structure (e.g., the load beam) of the ILS assembly. For ESD protection, a removable short-shunting strip is provided at the multiconnector to provide an effective means of temporarily protecting the read and write heads from ESD. In the ILS assembly process, the short-shunting strip is maintained, but it must be removed when the ILS assembly is ready to be tested for its functionality or to be installed in a disk drive.

While these earlier schemes were satisfactory in reducing ESD damage to the MR heads in an ILS assembly, they are not without limitation. If the shunting strip remains on the ILS, it is impossible to conduct functionality tests on either MR read sensor, write transducer, or a combination of the two. The shunting strip shunts the ESD transient, but also shunts the signal from the sensors. As a consequence, the shunting strip becomes an issue in the quality control of disk drives. It should be removed at some point in time in the ILS assembly process.

In the past, during the removal of the short-shunting strip, an ESD event may result from static buildup on a tool used to separate the strip, which for example can be an electrically conductive scissor. If the electrical current is large enough, damage can occur to part or all of the recording head. What is needed is a more reliable method for protecting the MR head of an ILS assembly from an ESD event. ESD protection schemes designed for integrated suspension assemblies with twisted wire can be difficult to implement or are not suitable for ILS assemblies, due to the significant size differences between the two types of assemblies. Further, once the short-shunting strip is removed, there is no shunting of ESD available when the ILS assembly is subsequently being handled. It is therefore desirable to provide a means for shunting that remains available on the ILS.

SUMMARY OF THE INVENTION

The present invention overcomes the drawbacks of the prior art and allows functional tests to be conducted while MR heads remain ESD protected during the suspension manufacturing process. One aspect of the present invention provides at least two levels of ESD protection, shunting and grounding of a suspension assembly. Shunting is typically done by shorting the sensors to shunt the transient current to prevent the full amplitude of the current to pass through and damage the sensors. Grounding eliminates the transient current from reflecting back and forth in the circuit that consists of the sensors. Grounding provides a means of leveling off any electrical voltage offset between the suspended heads and objects such as tools, human bodies, or anything else that makes contact with the sensors. Shunting and grounding may be alternatively implemented to provide ESD protection. However, grounding coupled with shunting provides the most effective ESD protection.

For purpose of illustrating the principles of the present invention and not limitation, the present invention is described by reference to an Integrated Lead Suspension (ILS) assembly. However, it is understood that the present invention can be implemented generally to other types of suspension assemblies without departing from the scope or spirit of the present invention.

In the described embodiment, the present invention couples shunting (shorting) pads to the conductor leads of a suspension assembly, which can be used to temporarily shunt (short) the leads to prevent damage to the heads by ESD. In one embodiment, the suspension assembly includes shunting pads that are sized and positioned to allow shunting and/or grounding using a probe. In another embodiment, a suspension assembly includes a built-in shunting tab that when applied, temporarily shunts the MR read head and prevents any transient voltage from developing across the head. In a further embodiment, a tool having multiple probes is integrated into a jig, which is used for holding and shunting and/or grounding one or more suspension assemblies during processing. The present invention thus provides for functional tests to be conducted while MR heads remain ESD protected during the suspension manufacturing process.

BRIEF DESCRIPTION OF THE DRAWINGS

For a fuller understanding of the nature and advantages of the invention, as well as the preferred mode of use, reference should be made to the following detailed description read in conjunction with the accompanying drawings. In the following drawings, like reference numerals designate like or similar parts throughout the drawings.

DETAILED DESCRIPTION OF THE PREFERRED EMBODIMENT

This invention is described in a preferred embodiment in the following description with references to the following figures. While this invention is described in terms of the best mode of achieving this invention's objectives, it will be appreciated by those skilled in the art that variation may be accomplished in view of these teachings without deviating from the spirit or scope of the invention. It is noted that the present invention is described, by way of example and not limitation, in reference to ILS. It is understood that the ESD protection concept of the present invention can be generally applied to suspension assemblies of other types.

Figure 1:
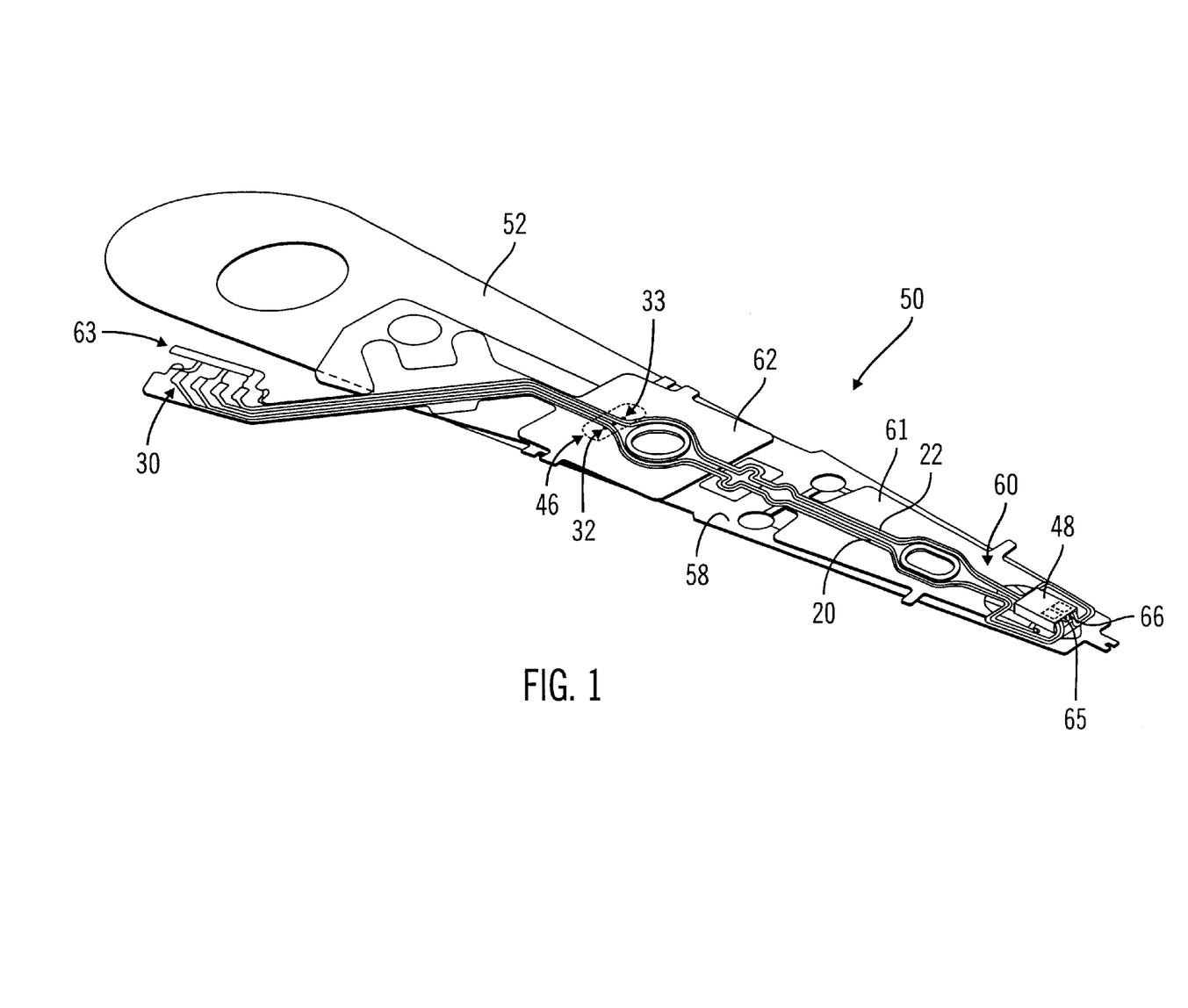
FIG. 1 is a perspective view of an ILS assembly embodying ESD protection in accordance with one embodiment of the present invention.
Figure 2:
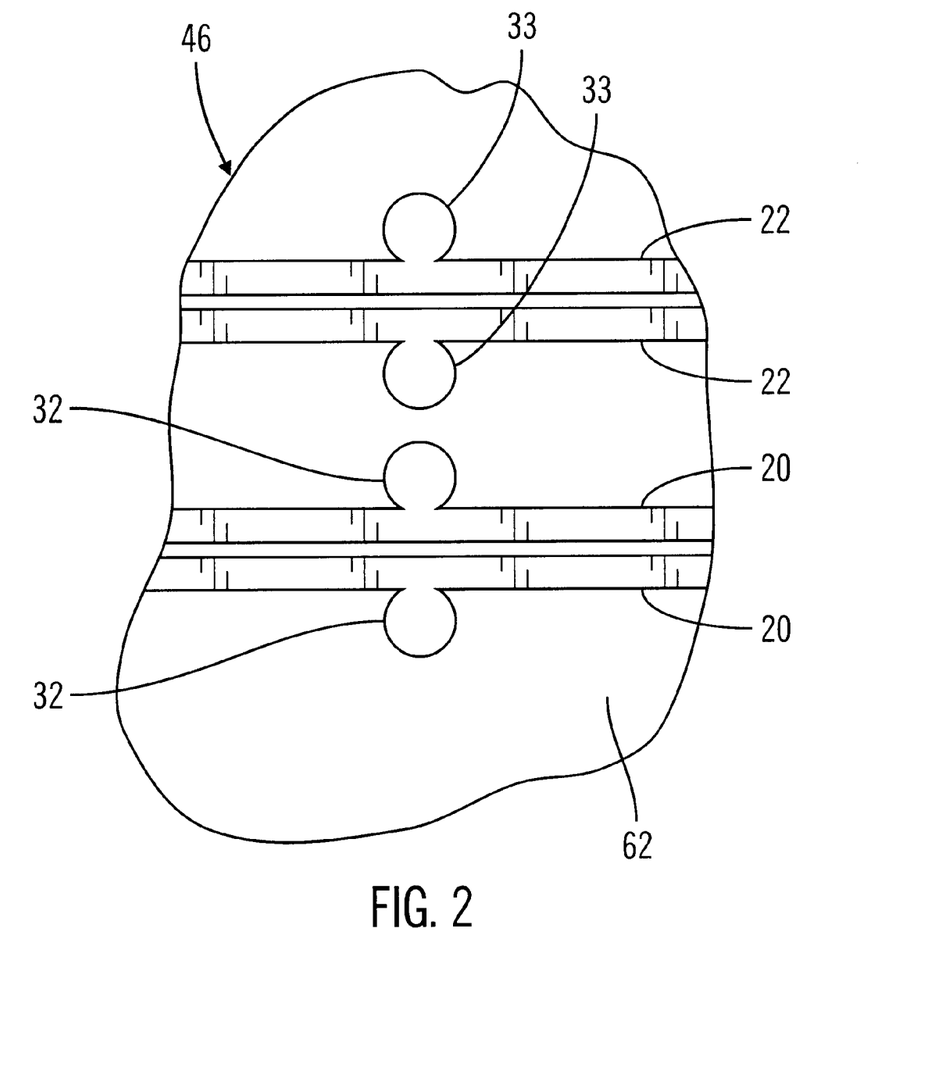
FIG. 2 is an enlarged top view of the shunting (shorting) pad region, in accordance with one embodiment of the present invention.
Figure 6:
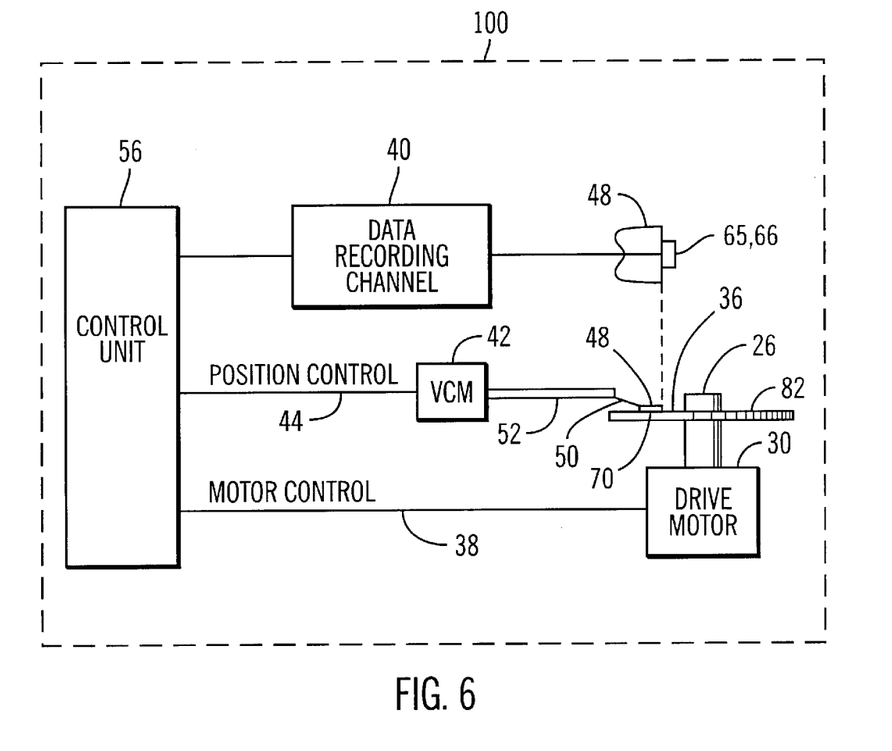
FIG. 6 is a simplified block diagram of a magnetic disk storage system embodying the present invention.

Referring now to the drawings, FIG. 1 shows a perspective view of an ILS 50 and FIG. 2 shows a magnified view of the shunting pad region 46 of the ILS 50. The ILS 50 is coupled to an actuator arm 52 (also shown in FIG. 6) that pivotally supports the ILS 50. The ILS 50 comprises a load beam 58 and a flexure 60 including a section 62. One end of the load beam 58 is attached to the actuator arm 52, and the other end supports on its surface the flexure 60. Bonded to the distal end of the flexure 60 is a slider 48, comprising an integrated MR read head 65 and an inductive write transducer 66. The flexure 60 includes an integrated assembly of a layer of flexible material 61, such as stainless steel, and electrical conductive leads, such as conductive traces in the case of an ILS (e.g. MR read head conductor leads 20 and inductive write transducer conductor leads 22; which in combination will be referred to as integrated conductor leads). MR read head conductor leads 20 and inductive write transducer conductor leads 22 supported on the flexible material 61 and separated by an insulating layer. One end of the MR read head conductor leads 20 terminates at the slider 48, where it is attached to and forms an electrical connection with the MR read head 65. The other end of the leads terminates in a wire ribbon and multiconnector 30 that extends from the load bearing support structure (i.e., the multiconnector 30 is not supported against the surface of the actuator arm 52 or the load beam 58). The multiconnector 30 is used to electrically connect the slider 48 to the electronics of the control unit 56 (as shown in FIG. 6). A short-shunting strip 63 is connected to the multiconnector 30 for electrically shunting the inductive write transducer 66 and integrated MR read head 65 to prevent ESD during general manufacture and assembly processes.

Figure 5:
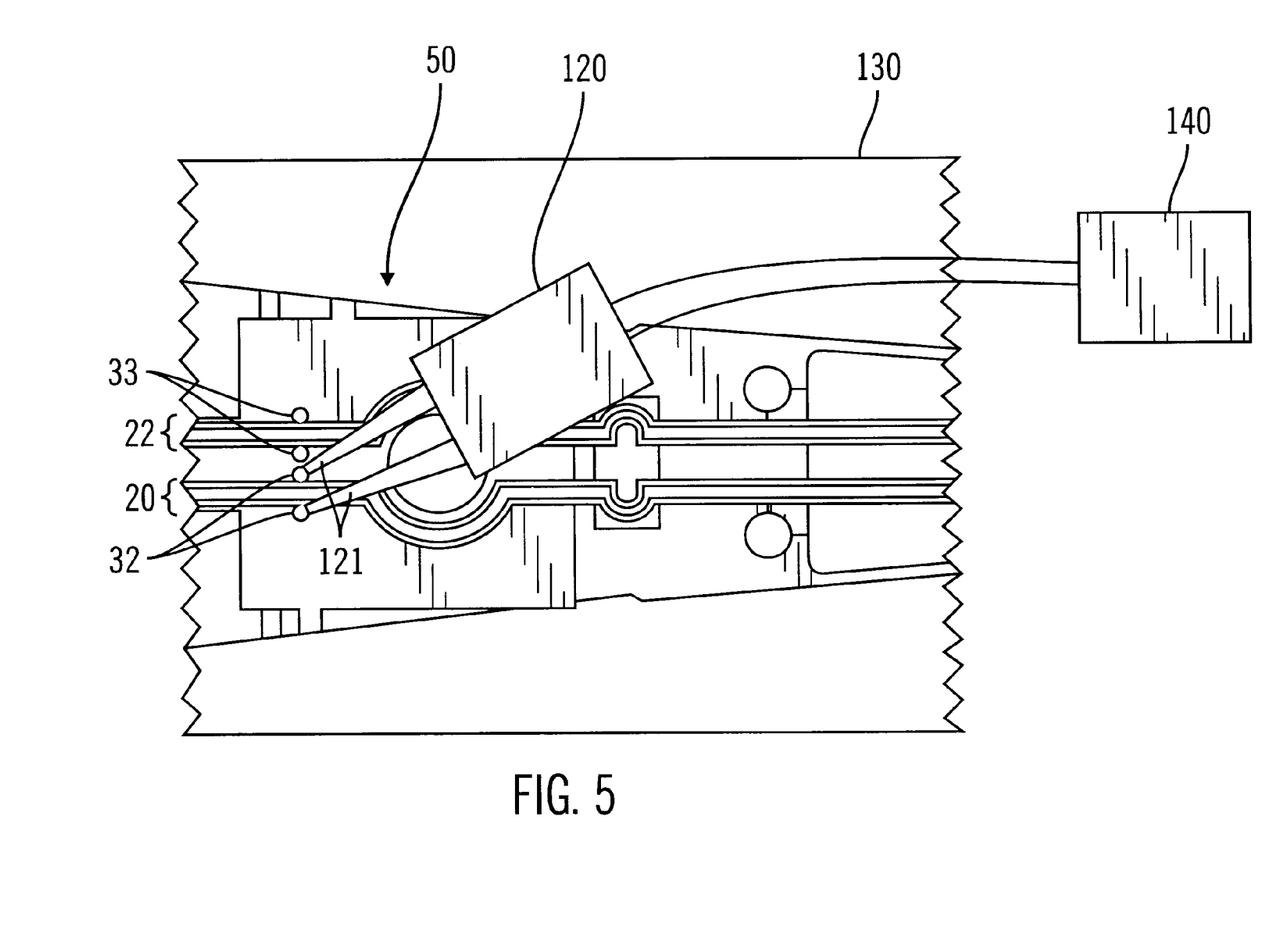
FIG. 5 is a top view of the ILS assembly attached to a jig having an integrated shorted probe tool (preferably grounded) in accordance with one embodiment of the present invention.

Along the MR read head conductor leads 20 are two integrated ESD shunting pads 32, one for each of the separate conductor leads 20. The two shunting pads 32 are formed as part of the layering and etching process along with the integrated conductor leads during flexure fabrication. The shape of the shunting pads 32 may be circular, square, or other shape, of a size that is relatively large to provide optimum surface area for a probe tab (as shown in FIG. 5) or other similar device to make contact with it. For example, for a suspension having a length on the order of 25 mm, the leads 20 may be on the order of 60 $\mu$m wide, and the pads may be on the order of about 125×125 $\mu$m square. The shunting pads 32 are located on any region of the suspension 50 that provides sufficient clearance for contact to be made by the shunting devices mentioned above. As shown in the figures, the shunting pads 32 may be located on the section 62 that supports the integrated conductor leads. Other locations on the suspension 50 may also be suitable for the shunting pads 32. Preferably, the shunting pads will be located away from the slider 48, somewhere between the mid-section and the actuator end of the suspension 50, where larger structural surface area and clearance are available for supporting the pads.

Additional shunting pads 33 or similar structure can be incorporated into the inductive write transducer conductor leads 22 for providing ESD protection to the inductive write transducer 66 in a manner similar to the shunting pads 32 for the integrated MR read head 65. One end of the inductive write transducer conductor leads 22 is attached to and forms an electrical connection with the inductive write transducer 66 and the other lead terminates at the multiconnector 30.

Figure 3:
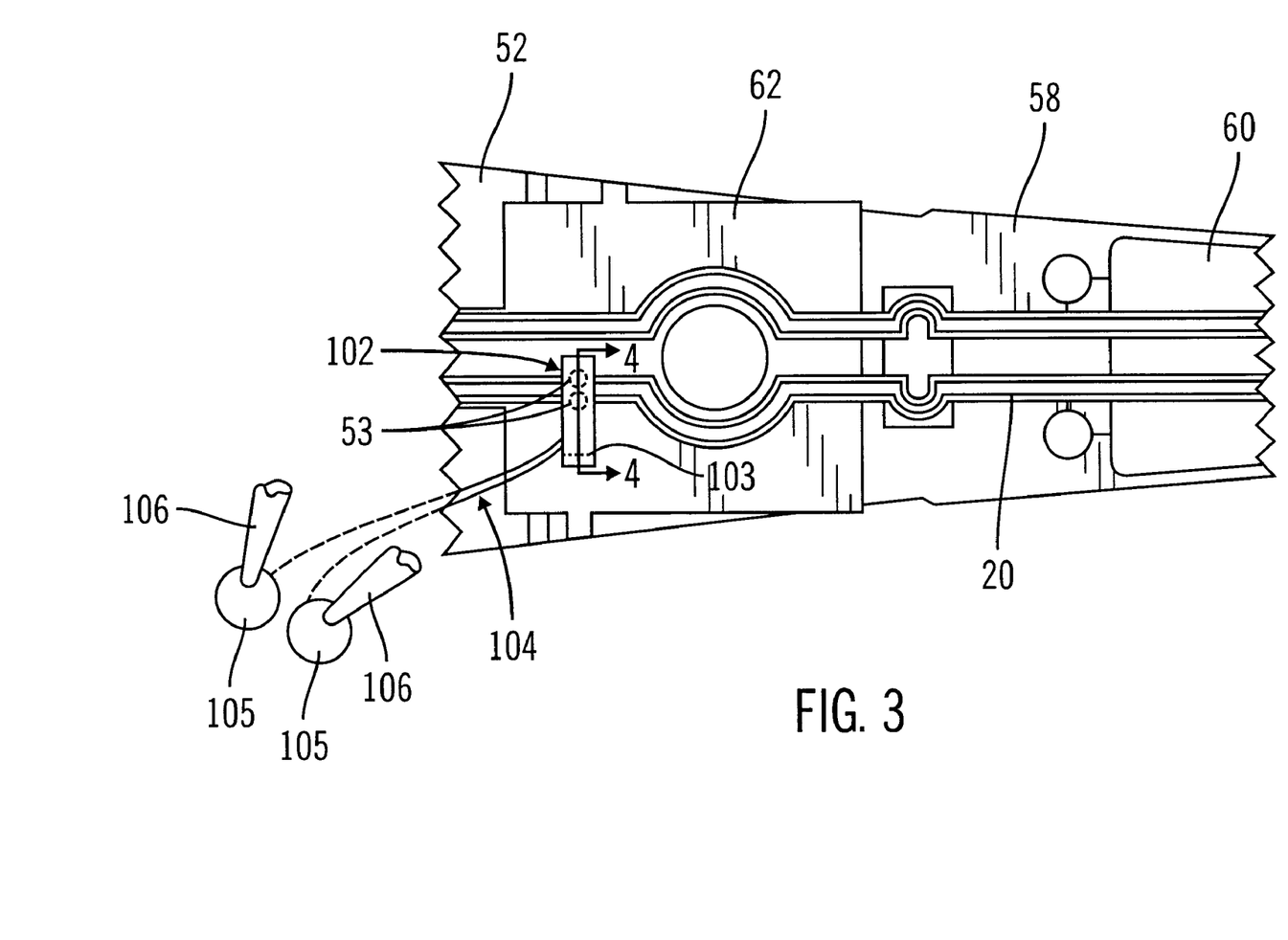
FIG. 3 is a top view of an ILS assembly with an integrated shunting tab in accordance with one embodiment of the present invention.
Figure 4:
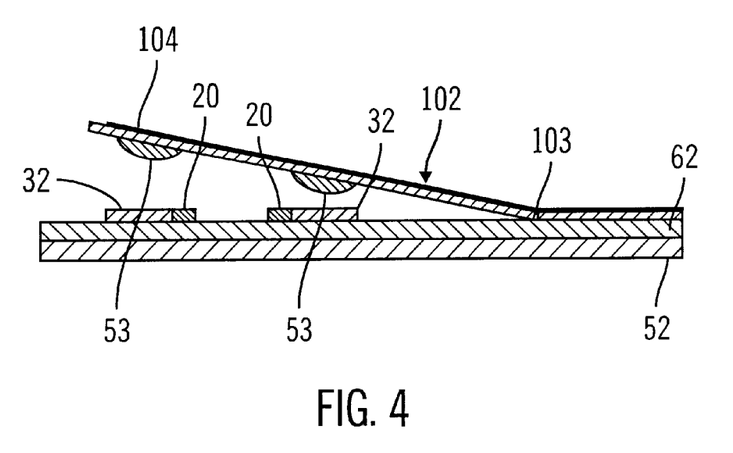
FIG. 4 is a sectional view of a shunting tab taken along line 4—4 in FIG. 3.

FIG. 3 and FIG. 4 show another embodiment of the present invention comprising an ILS 50 having a shunting tab 102, located near the integrated MR read head shunting pads 32. The shunting tab 102 is generally rectangular shaped and preferably made with a spring material such as stainless steel, copper, Kovar, etc. In one embodiment, the shunting tab 102 can also be made with a non-conductive material, such as ESD dissipative plastics. Additionally, the shunting tab 102 can have a line of perforation 103, preferably as low as possible towards the base of the ground tab 102 to help facilitate the mechanical removal of the shunting tab 102 when desired. Attached to the underside of the shunting tab 102 (the side facing the shunting pads 32) are two contact pads 53 that are connected to a pair of conductor leads 104. The contact pads 53 can be made with a conductive material or an ESD dissipative material such as zirconia ceramic (on the order of $10^9$ ohms) and the conductor leads 104 typically consist of a wire or printed wire on Mylar material. The conductor leads 104 run along the section 62 and terminate into two access pads 105 (as shown schematically in FIG. 3) that can either be attached to an area of the ILS 50 or extends beyond the ILS 50. The access pads 105, which are larger in planar area than the shunting pads 32, facilitate probing using probes 106. The probes 106 may be applied for conducting continuity checks, testing the MR head and write transducer, grounding and/or shorting the conductor leads 20 and 22 to the slider 48.

It can be appreciated that the larger access pads 105 are easier to work with using the probes 106, compared to the smaller shunting pads 32. The contact pad 53 on the shunting tab 102 is aligned with the shunting pads 32 such that when the shunting tab 102 is depressed towards the flexure, the contact pad 53 and shunting pad 32 contact each other. Probes 106 may be shorted and/or grounded. During the time that the shunting pads 32 are in contact with the contact pads 53, the integrated MR head 65 is shorted (e.g., via leads 104 and access pads 105), thereby protecting it from ESD damage. When pressure is removed from the shunting tab 102, the contact pads 53 and shunting pads 32 are separated.

In another embodiment, the shunting tab 102 can be made with a conductive material such as stainless steel, to which the contact pads 53 are attached. When the shunting tab 102 is depressed towards the flexure, the contact pads 53 contact the shunting pads 32 and short the integrated MR head 65, protecting it from ESD damage. In addition, the entire shunting tab 102 may be grounded via a conductor lead to a grounding point (not shown), in a similar fashion as the leads 104 in FIG. 4.

During assembly, in order to test the integrated MR read head 65 are installed on the ILS 50, the short-shunting strip 63 needs to be removed from the multiconnector 30 (as shown in FIG. 1). A cutting tool such as a pair of scissors is used to remove the short-shunting strip 63. If the scissor is not designed for ESD protection then it is possible for the scissor to hold a static charge, which can be released upon contact through the integrated conductor leads, and into the integrated MR read head 65 and or inductive write transducer 66. Static buildup on the scissor is possible if, for example, the scissor contains metal blades and a plastic handle. To prevent the described ESD damage from occurring, the shunting tab 102 is depressed prior to the removing the short-shunting strip 63 from the multiconnector 30. By providing a shunting tab 102, additional shunting may be undertaken when needed during subsequent manufacturing steps and handling of the ILS. At the point of final assembly, the shunting tab 102 may be physically and permanently removed if desired, for example by snapping off the tab 102 from the ILS 50.

FIG. 5 is a schematic view of a jig 130 and tool 120 used to hold and protect the ILS 50 from ESD damage during its assembly. The tool 120 comprises of a pair of probes 121 which make contact with the shunting pads 32 when activated. The tool 120 is applied to the jig 130 by means of a robotic structure, for example, a hinge or track (not shown). The jig 130 provides automated accurate positioning of the tool 120 for probing the shunting pads 32 (if shunting tab 102 has been removed or not been utilized) and/or access pad 105 (using probes 106; if shunting tab 102 is still in place). The tool 120 may also be shorted to provide a shunt and/or electrically grounded to dissipate any transient current that may otherwise reach and damage the MR head.

The probes are made with an electrically conducting material or contain grounded tips made of such material. The diameter of each probe tip is typically less than the diameter of the shunting pads 32 to reduce the chances of it contacting surrounding parts.

To verify that contact has been made between the tool 120 and the shunting pads 32, the resistance of the integrated MR read head 65 can be measured through the tool 120 by using a resistance meter 140. Typically, a functioning integrated MR read head 65 may have a resistance on the order of 40 ohms. If, for example, the measurement from the resistance meter 140 indicates a relatively large resistance, this can either indicate that the integrated MR read head 65 is defective or that the tool 120 is not securely contacting the shunting pads 32. Reference may be made to U.S. Pat. No. 5,959,827, assigned to IBM Corporation, which discloses a grounding unit, which may be modified to facilitate probing (e.g., testing, shunting and/or grounding) the ILS 50 with shunting pads 32 in accordance with the present invention. While FIG. 5 shows the operation of the jig 130 and tool 120 for one ILS assembly, it is within the scope and spirit of the present invention to scale up the jig 130 and tool 120 to allow probing of more than one ILS assemblies, either simultaneously or in sequence.

While the foregoing discussions were in reference to shunting pads 32 for the MR read head 65, they are also applicable to the shunting pads 33 for the inductive write transducer 66. The MR read head 65 and the inductive write transducer 66 can be probed simultaneously or in sequence if necessary. In the case of shunting the inductive write transducer 66, while the inductive write transducer 66 is not as ESD sensitive as the MR read head 65, an ESD transient through a inductive write transducer 66 can be introduced to the MR read head 65 by capacitance coupling, for example, of integrated leads (for both read and write). Ideally, both the MR read head 65 and the inductive write transducer 66 should be shunted for the best ESD protection on the MR read head 65.

FIG. 6 illustrates a simplified schematic block diagram of a magnetic disk storage system 100 embodying the ILS in accordance with the present invention. The magnetic disk storage system comprises at least one rotatable magnetic disk 82 which is supported on a spindle 26 and rotated by a disk drive motor 30, and at least one slider 48 positioned in close proximity to the magnetic disk 82 at the disk surface 36. Data is stored on each disk 82 in the form of an annular pattern of concentric data tracks (not shown). Each slider 48 contains one or more integrated MR read heads 65 and inductive write transducers 66 which are attached to an actuator arm 52 by means of a suspension assembly 50. Each actuator arm 52 is attached to an actuator 42. The actuator as shown in FIG. 1 may be a voice coil motor (VCM). As the disk 82 rotates, the slider 48 is controlled to move across the disk surface 36 by the actuator 42 so that the slider 48 may access different portions of the disk surface 36 where desired data is recorded or read. The slider 48 flies in close proximity over the rotating disk surface 36, riding on an air bearing 70 formed between the magnetic head's MR read heads 65, inductive write transducers 66 and the rotating disk surface 36. The ILS 50 provides a slight spring force which biases the slider 48 against the disk surface 36 and controls flexibility in slight vertical as well as roll and pitch movements of the slider 48 relative to the rotating disk surface 36. The various components of the magnetic disk storage system are controlled in operation by control signals generated by the control unit 56, such as drive motor signals of line 38, head position and seek control signals on line 44.

Read and write signals are communicated to and from MR read head 65 and inductive write transducer 66 by means of a recording channel 40. All of the components of the magnetic disk storage system are enclosed in housing 45.

In summary, the present invention provides a method of protecting the integrated transducers of a suspension assembly from an ESD event by providing shunting pads that are directly attached to the integrated conductor leads and which can be shorted and/or grounded by various means as described in the different embodiments. The shunting pads can provide ESD protection during and after removal of the prior art short-shunting strip because the pads are permanently attached to the suspension. In addition, the shunting pads are supported on the load bearing structure of the suspension, thus providing a stable structure for applying the shunting tab or probe. The built-in shunting tab provides an additional advantage of being reusable at anytime the suspension is handled during assembly and does not require a shunting probe.

While the present invention has been described with respect to the preferred embodiments in accordance therewith, it will be apparent to those in the skilled art that various modifications and improvements may be made without departing from the scope and spirit of the invention. Accordingly, the disclosed invention is to be considered merely as illustrative and limited in scope only as specified in the appended claims.

I claim:

1. A suspension assembly for supporting a slider in a magnetic storage system, comprising:
    a load beam;
    a flexure, comprising a longitudinal, generally flat flexible member supported on the load beam;
    electrical conductive leads with a first end of the conductive leads terminating at the slider and a second end of the conductive leads terminating in a connector positioned for electrical coupling to external controls;
    the connector including a removable shunt electrically shorting the conductive leads; and
    shunting means provided on the flexure and coupled to the conductive leads for facilitating shunting electrostatic charges introduced to the suspension assembly from reaching the slider, wherein said shunting means is separate from the removable shunt.

2. A suspension assembly as in claim 1, wherein the shunting means comprises electrical conductive pads formed on the flexure and coupled to the conductive leads.

3. A suspension assembly as in claim 2, wherein conductive leads are conductive traces formed on the flexure, and the conductive pads are integral part of the conductive traces.

4. A suspension assembly as in claim 3, wherein the conductive pads are formed in the same process as the conductive traces.

5. A suspension assembly as in claim 4, wherein the conductive pads are formed adjacent the conductive traces.

6. A suspension assembly as in claim 2, wherein conductive pads are sized on the order of at least twice the width of a conductive lead, to facilitate applying a shunting probe to the pads.

7. A suspension assembly as in claim 2, wherein the connector extends beyond the support of the load beam.

8. A suspension assembly as in claim 1, wherein the shunting means is located on the flexure at a location between the slider and the connector.

9. A suspension assembly as in claim 1, wherein the shunting means comprises a shunting tab pivotally attached to the flexure and positioned for momentary contact with at least two conductive leads upon applying a force on the tab.

10. A suspension assembly as in claim 9, wherein the shunting tab further comprises contact means for electrically coupling to the conductive leads.

11. A suspension assembly as in claim 10, wherein the shunting means further comprises electrical conductive pads formed on the flexure and coupled to the conductive leads; and wherein the contact means comprises contacts, each positioned for contact with a conductive pad.

12. A suspension assembly as in claim 11, wherein the contacts are made of an electrical conductive material.

13. A suspension assembly as in claim 11, wherein the contacts are made of an electrostatic dissipative material.

14. A suspension assembly as in claim 12, wherein the shunting means further comprises conductive leads electrically coupling the contacts to an external contact point.

15. A suspension assembly as in claim 14, further comprising a load beam supporting the flexure, wherein the conductive pads are positioned on the flexure at a section that is supported by the load beam.

16. A suspension assembly as in claim 9, wherein the shunting tab is further removably attached to the flexure.

17. A suspension assembly as in claim 16, wherein the shunting tab is removably attached to the flexure using an adhesive material.

18. A suspension assembly as in claim 16, wherein the shunting tab is removably attached to the flexure using a breakage link.

19. A flexure for supporting a slider in a magnetic storage system, comprising:
    a longitudinal, generally flat flexible member;
    electrical conductive leads, with a first end of the conductive leads terminating at the slider and a second end of the conductive leads terminating in a connector positioned for electrical coupling to external controls;
    the connector including a removable shunt electrically shorting the conductive leads; and
    shunting means provided on the flexure and coupled to the conductive leads for facilitating shunting electrostatic charges introduced to the conductive leads from reaching the slider, wherein said shunting means is separate from the removable shunt.

20. A magnetic storage system, comprising:
    a magnetic storage medium with a data surface of concentric data tracks;
    a motor drive for rotating the magnetic storage medium;
    a slider including a read/write transducer maintained in operative relationship with the data surface during relative rotation between the slider and the magnetic storage medium;
    a control system controlling at least some of the operation of the magnetic storage system; and
    an actuator assembly coupled to the slider for pivotally positioning said slider relative to the magnetic storage medium to selected tracks on the data surface, the actuator assembly comprising a suspension assembly that comprises:
    (a) a flexure supported by the load beam, comprising a longitudinal, generally flat flexible member;
    (b) electrical conductive leads, with a first end of the conductive leads terminating at the slider and a second end of the conductive leads terminating in a connector positioned for electrical coupling to the control system;
    (c) the connector including a removable shunt electrically shorting the conductive leads; and (d) shunting means provided on the flexure and coupled to the conductive leads for facilitating shunting electrostatic charges introduced to the conductive leads from reaching the slider, wherein said shunting means is separate from the removable shunt.

21. An apparatus for grounding a flexure that comprises a longitudinal, generally flat flexible member, conductive leads, a slider mounted at an end, and shunting pads formed on the flexure and coupled to the conductive leads for facilitating shunting electrostatic charges introduced to the conductive leads from reaching the slider, the apparatus comprising:

means for supporting the flexure;

a probe that is electrically grounded; and means for positioning the probe with respect to the shunting pads on the flexure.

22. A method of making a suspension assembly for supporting a slider in a magnetic storage system, comprising the steps of:

forming a flexure comprising a longitudinal, generally flat flexible member;

providing electrical conductive leads, with a first end of the conductive leads terminating at the slider and a second end of the conductive leads terminating in a connector positioned for electrical coupling to external controls;

providing a removable shunt electrically shorting the conductive leads at the connector; and forming shunting means on the flexure and coupled to the conductive leads for facilitating shunting electrostatic charges introduced to the conductive leads from reaching the slider, wherein said shunting means is separate from the removable shunt.

23. For a flexure having a longitudinal, generally flat flexible member and conductive leads formed thereon, said conductive leads terminating in a connector positioned for electrical coupling to external controls, and a slider mounted at an end, a method of shunting the conductive leads against electrostatic charges introduced to the conductive leads, comprising the steps of:

providing the connector including a removable shunt electrically shorting the conductive leads;

forming shunting means on the flexure which is coupled to the conductive leads for facilitating shunting electrostatic charges introduced to the conductive leads from reaching the slider, wherein said shunting means is separate from the removable shunt; and momentarily shunting the conductive leads using the shunting means.

24. A method as in claim 23, wherein the step of momentarily shunting comprises the step of electrically shorting the shunting means.

25. A method as in claim 24, wherein the step of momentarily shunting further comprises the step of electrically coupling the shunting means to a ground.

26. A method as in claim 23, wherein the step of momentarily shunting comprises the step of electrostatically dissipating the electrostatic charges.

27. A method as in claim 23, further comprises the step of removing the removable shunt from the connector while the conductive leads are shunted using the separate shunting means.

28. A suspension assembly for supporting a slider in a magnetic storage system, comprising:

a flexure, comprising a longitudinal, generally flat flexible member;

integral electrical conductive leads in the form of traces formed on the flexure, with a first end of the traces terminating at the slider and a second end of the traces terminating in a connector positioned for electrical coupling to external controls;

the connector including a removable shunt electrically shorting the conductive leads; and shunting means provided on the flexure and coupled to the traces for facilitating shunting electrostatic charges introduced to the suspension assembly from reaching the slider, wherein said shunting means is separate from the removable shunt.

29. A suspension assembly as in claim 28, wherein the shunting means comprises electrical conductive pads formed on the flexure and coupled to the traces.

30. A suspension assembly as in claim 28, further comprising a load beam which supports the flexure.

* * * * *